Jan. 3, 1950  J. A. HENNE  2,493,195
PHOTOGRAPHIC SHUTTER HAVING A PIVOTED
BLADE AND COVER BLIND
Filed March 20, 1947  3 Sheets-Sheet 3
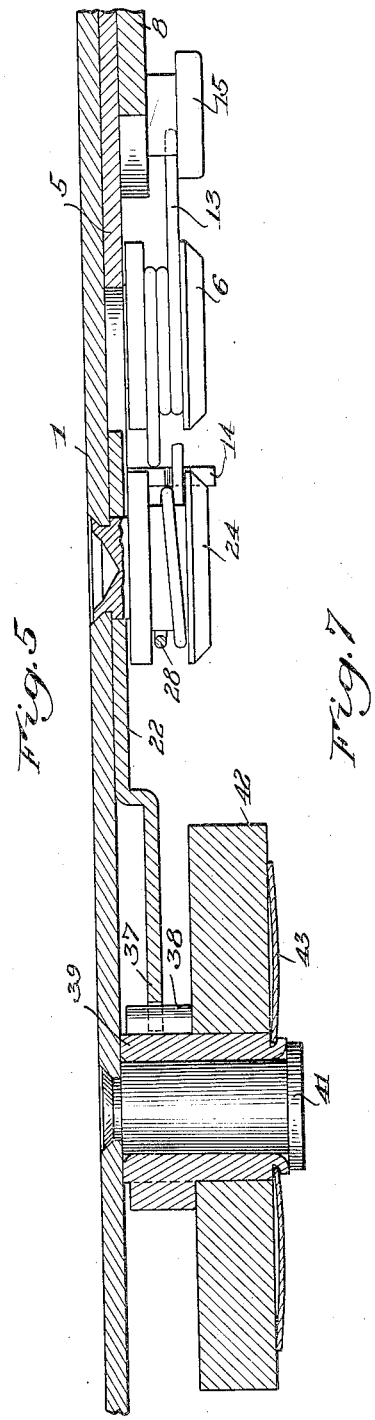
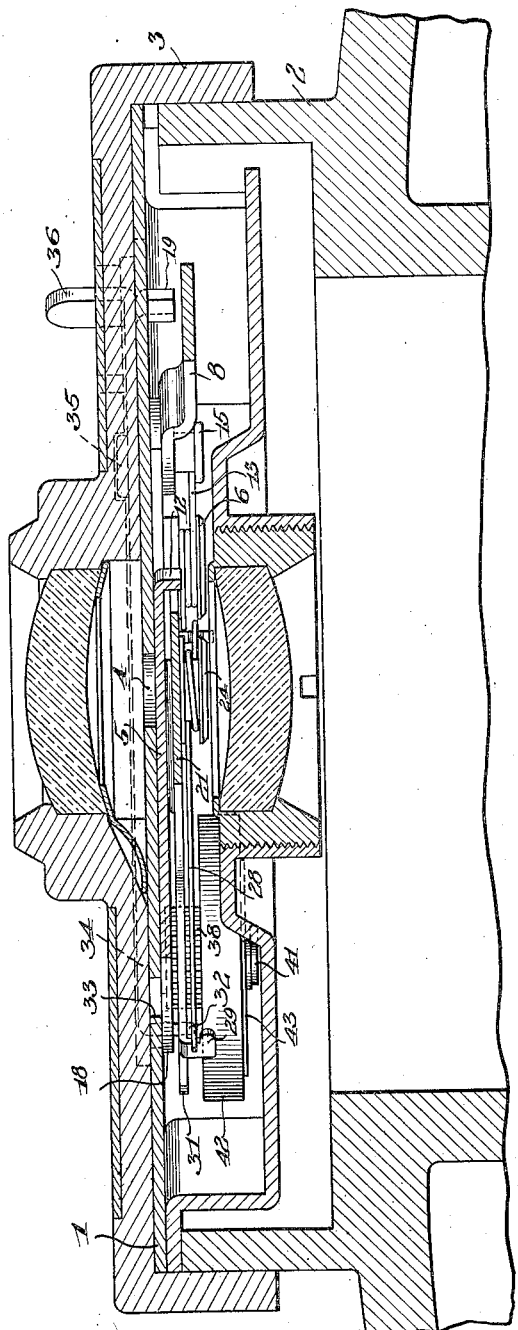
INVENTOR.
Julius A. Henne
BY
Harold E. Stonebraker
his Attorney Patented Jan. 3, 1950

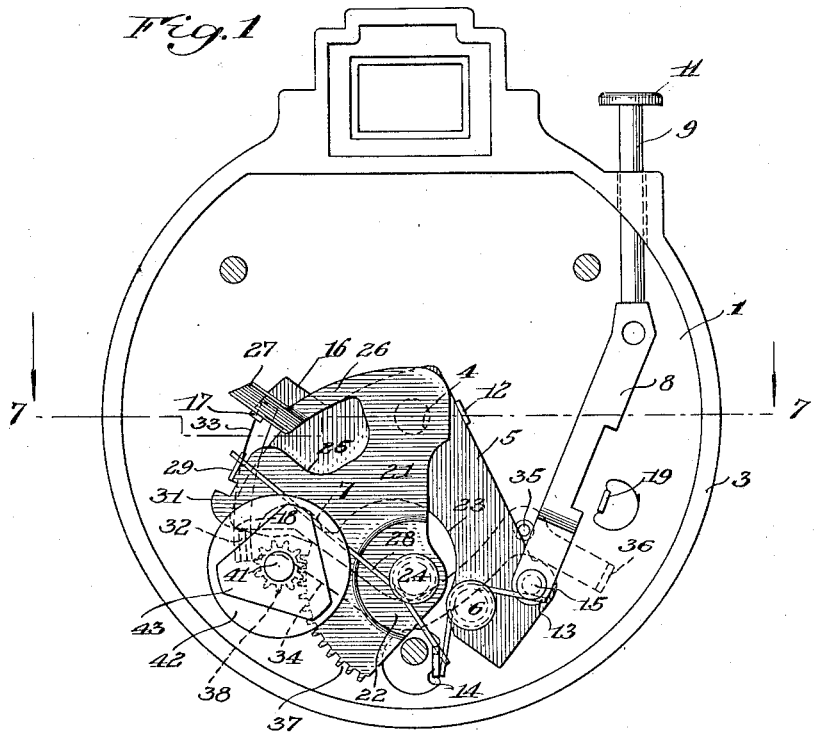
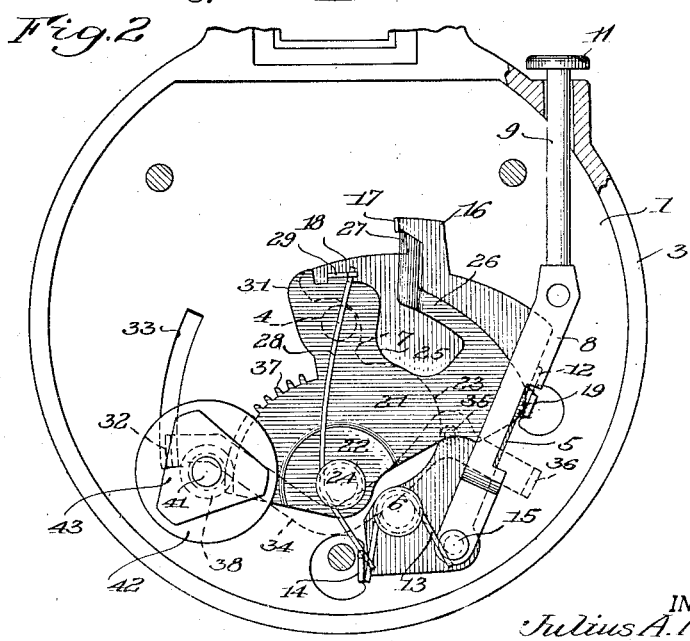

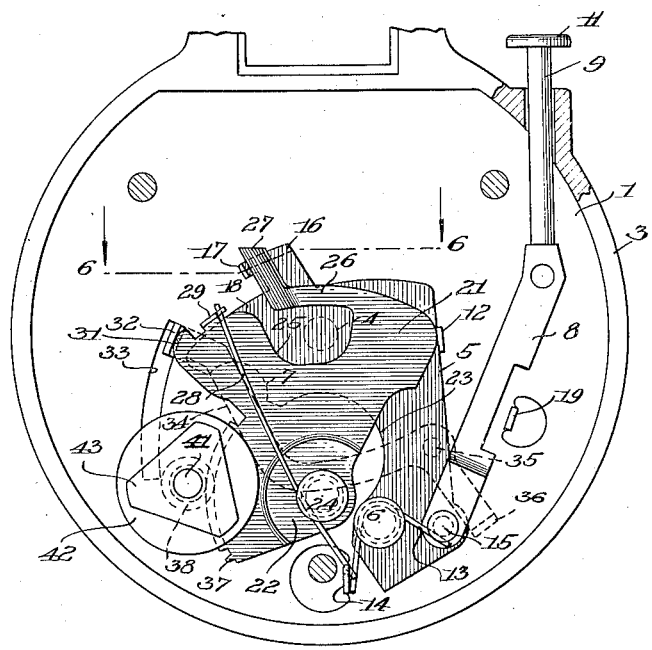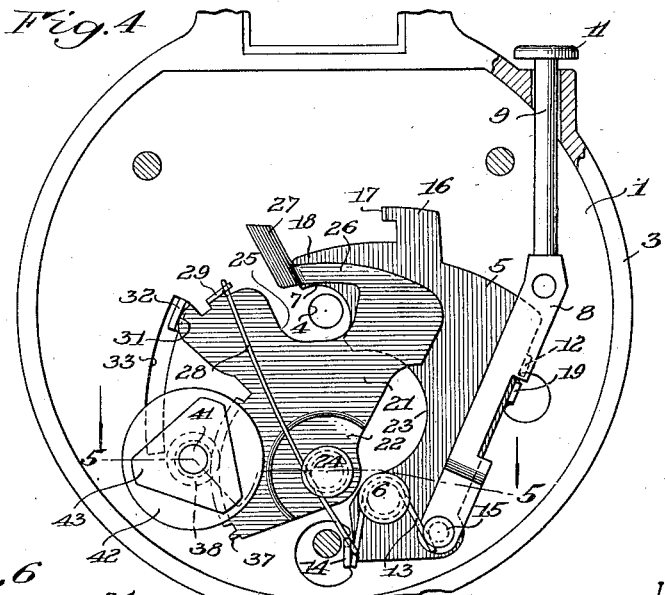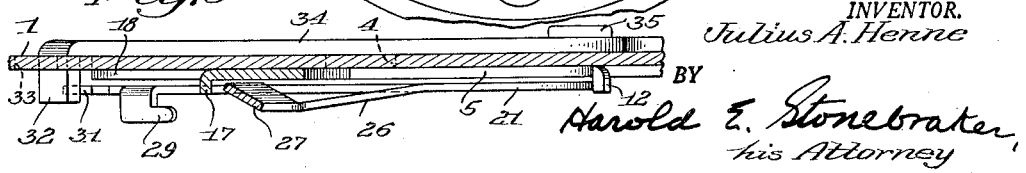

2,493,195

UNITED STATES PATENT OFFICE 2,493,195

PHOTOGRAPHIC SHUTTER HAVING A PIVOTED BLADE AND COVER BLIND

Julius A. Henne, Rochester, N. Y., assignor to Webster Industries, Inc., Webster, N. Y., a corporation of New York Application March 20, 1947, Serial No. 735,985

3 Claims. (Cl. 95—60)

This invention relates to a photographic shutter of the general type in which a shutter opens and closes an exposure aperture for an instantaneous operation upon moving an actuator in one direction, or opens the exposure aperture for a time exposure upon moving the actuator in one direction, the exposure aperture being closed upon releasing the actuator, and a principal object of the invention is to afford a simplified and practical arrangement having few parts which can be manufactured at a low cost and lends itself to embodiment in a popular priced camera.

Another purpose of the invention is to afford a shutter mechanism employing a pivoted shutter blade and a shutter guard eccentrically pivoted to swing about an axis spaced slightly from that of the shutter blade and operating effectively when moved to tension the shutter blade and to release it by reason of their eccentric movement before the shutter guard reaches the limit of its movement, and to cover the exposure aperture during the tensioning movement of the shutter blade and also when the aperture is uncovered by the shutter blade for a time exposure.

A further purpose of the invention is to provide an improved construction of shutter blade and shutter guard combined and functioning in the general fashion mentioned above, the shutter blade being provided with a central opening and a radially extending spring finger located outwardly from said opening and engaged by an actuating portion on the shutter guard, affording cooperating engaging portions one of which moves radially relatively to the other until it slips off and is released, while moving under the spring finger to reengage the same during the return of the parts to initial position.

Still an additional object of the invention is to afford shutter mechanism in which a shutter blade and shutter guard are each integrally formed from a single sheet metal blank and require in addition only an actuator, controlling springs, and an adjustable stop determining the initial position of the shutter blade for selecting an instantaneous or time exposure.

A further object of the invention is to provide a simple and improved form of retarding mechanism associated with the shutter blade, in order to impart uniform movements to the shutter blade with a smooth, even, and constantly controlled movement at all times, without shock, jar, or rebound to any of the parts.

More particularly, the invention has for a purpose to provide a retard mechanism involving a gear and friction slip connection between a retarding weight and a shutter blade so as to effect a slow, even return movement of the shutter blade in a manner that effectively prevents bending or deforming of the connecting gear teeth or rebound of the shutter blade.

An additional object of the invention is to afford a simplified construction and practical arrangement that permits operating the shutter indefinitely under varying conditions without affecting its efficiency, without appreciable wear of the parts, and without likelihood of damage or disarrangement that might require frequent servicing.

To these and other ends, the invention consists in the construction and arrangement of parts that will appear clearly from the following description when read in conjunction with the accompanying drawings, the novel features being pointed out in the claims following the specification.

In the drawings:

Fig. 1 is a plan view showing a preferred embodiment of the invention, including a supporting plate and shutter mechanism mounted thereon, the stop being shown adjusted for an instantaneous exposure and the shutter blade in closed position;

Fig. 2 is a plan view showing the position of the parts when the actuator has been moved to operate the shutter and the shutter blade has been tensioned and is about to be released by the shutter guard prior to the latter reaching the limit of its travel;

Fig. 3 is a plan view showing the position of the parts with the stop adjusted for a time exposure and the shutter blade in closed position;

Fig. 4 is a similar view showing the position of the parts after the actuator and shutter guard have moved to their extreme positions, the shutter blade being released and restored to initial position while the shutter guard is held open to uncover the exposure aperture for a time exposure;

Fig. 5 is a transverse sectional view on line 5—5 of Fig. 4 partially broken away;

Fig. 6 is a detail sectional view on the line 6—6 of Fig. 3, and

Fig. 7 is a sectional view on the line 7—7 of Fig. 1.

Referring more particularly to the drawings in which like reference numerals refer to the same parts throughout the several views, 1 designates a supporting plate for the shutter mechanism, the supporting plate 1 being arranged within the housing 2 under a cover 3 which is provided with the usual lens opening while the supporting plate 1 includes the exposure aperture 4, and this invention has to do with the shutter mechanism by which the exposure aperture 4 is opened to admit light and closed either instantaneously, or for a period of time depending upon holding of the actuator and shutter guard by the operator.

To accomplish the contemplated objectives, there is provided a shutter blade pivotally mounted on the supporting plate and a shutter guard beneath the shutter blade and pivotally mounted on the supporting plate at a point spaced slightly from the pivotal axis of the shutter blade but in proximity thereto. The shutter blade and shutter guard are provided with co-operating engaging portions which travel in the same direction through intersecting converging circular paths of slightly different or equal radius so that upon operation of the actuator, the shutter guard engages and actuates the shutter blade to a point where the shutter blade is released by reason of their eccentric relationship and is returned by its tensioned spring to initial position, affording a compact, durable, and extremely efficient mechanical arrangement that is accurate and capable of indefinite operation without appreciable wear.

To these ends, there is provided a shutter guard including a body portion 5 pivoted on the stud 6 and lying adjacent to the supporting plate 1. The shutter guard is cut away centrally at 7 to expose the aperture 4, as shown in Fig. 4 and as will be described presently, while the body portion 5 has pivotally connected thereto an actuator or lever 8 including a push rod 9 that is slidable in a suitable bearing provided in the cover 3. When a push rod 9 is moved inwardly by engaging the head or finger portion 11, the shutter guard is rocked on its pivot 6 against the tension of its controlling spring to effect movement of the shutter blade in the manner that will appear presently.

The shutter guard is provided with a lug 12 which when the parts are in initial position for a time exposure, as in Fig. 3, engages the adjacent edge of the shutter blade and limits return movement of the shutter guard, the latter being actuated toward initial position by the coil spring 13 mounted on the stud 6 and having one end engaged with the lug 14 struck from the supporting plate 1 and the other end engaging the stud 15 pivotally connecting the shutter guard and the lever 8.

The shutter guard is provided with means that engages and actuates the shutter blade during their outward travel, and to this end is provided with a radial extension 16 having a lug 17 at its outer extremity, while 18 designates a circumferential tongue that travels under the shutter blade and limits return movement of the shutter guard for instantaneous exposures in a manner that will appear more clearly hereinafter, while outward movement of the shutter guard and also of the shutter blade in case of undue momentum is limited by the lug 19 struck up from the supporting plate 1.

The shutter blade comprises a body portion 21 that overlies the shutter guard in juxtaposition thereto and a central offset portion 22 which lies adjacent to the supporting plate 1 and is movable within the central cut-away portion 23 of the shutter guard. The offset portion of the shutter blade is pivotally mounted on a stud 24 so located that the pivotal axis of the shutter blade is in vertical alinement with the center of the exposure aperture 4, while the pivotal axis of the shutter guard 5 is in close proximity to the pivotal axis of the shutter blade and preferably to one side and beneath the latter as shown to afford the required eccentric relationship between the shutter blade and shutter guard. When the shutter guard is rotated, the lug 17 engaging a portion of the shutter blade actuates the latter to a point where the shutter blade slips off and is returned to initial position by its tensioned controlling spring to uncover the exposure opening 4, the latter being covered by the shutter guard during the outward movement of the shutter blade and before its slip-off.

The relation of the pivotal axes of the shutter guard and shutter blade are such as to have them in close proximity to one another, and also to position the cooperating engaging portions of the shutter guard and shutter blade which actuate and permit slip-off of the latter, in close proximity to one another, thus affording a compact and simplified arrangement which enables operating the shutter blade with minimum pressure and power and facilitates the functioning and durability of the shutter mechanism.

In order to effect movement of the shutter blade from the shutter guard and to permit the necessary slip-off, the body portion of the shutter blade is cut away centrally to provide the opening 25, while 26 designates a peripheral outwardly bent spring extension on the body portion extending around a portion of said opening and terminating in a radially extending finger 27, said spring finger 27 being bevelled or angularly disposed, as shown in Fig. 6, and the connecting portion 26 being inclined or bent outwardly from the body portion of the shutter blade so as to afford the necessary yieldability of the spring finger 27 which can lift readily when the lug 17 of the shutter guard rides thereunder during return travel of the latter. The shutter blade is controlled and returned to initial position by the spring 28 that is coiled around the stud 24 and has one end engaging the aforementioned lug 14 while its opposite end engages a lug 29 on the shutter blade.

When the shutter is adjusted for an instantaneous exposure, the spring finger 27 of the shutter blade lies in front of the lug 17 of the shutter guard, as shown in Fig. 1, so that upon movement of the shutter guard clockwise, the finger 27 and shutter blade are actuated with the shutter guard, tensioning its spring 28, until the spring finger 27 slips off of the lug 17 in the manner shown in Fig. 2, due to the eccentric travel of these parts about the spaced centers already described, and upon release of the shutter blade, the spring 28 returns it to initial position, causing the exposure opening 14 to be uncovered by the opening 25 in the shutter blade and subsequently closed by the body portion of the shutter blade. During the forward movement of the shutter blade while tensioning the spring 28, the exposure aperture 4 is covered by the body portion of the shutter guard, as shown in Fig. 1, the central cut-out portion 7 of the shutter guard serving to uncover the exposure opening 4 when the shutter blade reaches the slip-off position, as shown in Fig. 2.

Return movement of the shutter blade to initial position is limited by the tail-piece 31 on the shutter blade engaging a stop or lug 32, the latter extending through a slot 33 and formed as part of an adjustable lever 34 that is pivotally mounted on the underside of the supporting plate 1 about a stud 35, while 36 designates a finger portion for manipulating the stop lever 34 which is maintained frictionally with the stop 32 in adjusted position at either end of the slot 33 for effecting an instantaneous exposure when the stop 32 is at the lower end of the slot 33, as shown in Fig. 1, or for permitting a time exposure when the stop 32 is adjusted to the upper end of the slot 33, as shown in Figs. 3 and 4.

When the stop 32 is positioned at the lower end of the slot 33, as shown in Figs. 1 and 2, the shutter blade upon release returns to the position where the exposure opening 4 is covered, the latter being alternately opened and closed during the return movement of the shutter blade, whereas when the stop 32 is adjusted to the upper end of the slot 33, as shown in Figs. 3 and 4, the shutter blade can only return far enough to uncover the exposure aperture 4. Thus the exposure aperture is uncovered by the shutter blade, and remains uncovered as long as the shutter guard is held, and upon release of the operating lever, the shutter guard returns under the action of its controlling spring to initial position and covers the exposure aperture, so that the length of time of exposure depends upon the period during which the operating plunger 11 is held in its lower position.

When the stop 32 is adjusted to its lowermost position for an instantaneous exposure, as shown in Fig. 1, the bottom edge of the tail-piece 31 engages the upper edge of stop 32, and when the stop 32 is in its uppermost adjusted position for a time exposure, as shown in Fig. 3, the outer curved extremity of the tail-piece 31 engages the adjacent side of the stop 32, as shown in Figs. 3 and 4. This arrangement is such as to prevent movement of the stop by the impact of the shutter blade and also obviate any wedging action between the stop and the shutter blade. Thus the adjustable stop will remain in proper position for a time exposure indefinitely, regardless of the number of operations, and no resistance is offered to the operation of the shutter blade when the latter moves away from the stop, irrespective of whether the shutter blade is positioned for instantaneous or time exposures. When positioned for instantaneous exposures, there is a greater return movement of the shutter guard and in order to relieve the shutter blade from excessive shock and jar, the tongue 18 of the shutter guard engages the stop 32, as shown in dotted lines in Fig. 1, before the lug 12 engages the shutter blade, the shutter guard being thus limited in its movement by the stop and not by the shutter blade as in the time exposure position already described.

It is desirable to control the return movement of the shutter blade after slip-off from the shutter guard by retarding mechanism that slows up and gives uniformity to the action of the shutter blade and insures a smooth, even movement, and in order to accomplish this, the shutter blade includes as a part thereof a gear segment 37 in the same plane with its body portion 21. The gear segment 37 engages a pinion 38 preferably formed on a sleeve 39 that is rotatably mounted on a post 41 fixed to the supporting plate 1, while 42 designates a circular weighted element that is coaxially and rotatably mounted on the sleeve 39, as shown, and held in frictional engagement with the pinion by a curved spring plate 43 fixed to the upper end of the sleeve 39 and with its outer extremities engaging the upper surface of the weighted element 42.

With this arrangement, upon return movement of the shutter blade, the gear segment 37 is moved correspondingly and turns the pinion 38, sleeve 39, and weighted element 42, which latter acts as a retard to slow down the movement of the shutter blade somewhat upon its spring-actuated return and to insure a more uniform and regular movement. By having the weighted element loosely mounted on the sleeve 39 and held by the spring plate 43, relative movement between the sleeve 39 and weighted element 42 is permitted and consequently when the shutter blade reaches the limit of its return movement, the momentum imparted to the weighted element 42 causes the latter to turn on the sleeve 39 after the shutter blade strikes the stop 32, thus preventing shock to the parts, damage to the teeth of the gear segment and pinion, or rebound of the shutter blade. This is prevented by the continued movement of the weighted element 42 on the sleeve 39 until the pressure of the spring 43 brings the weighted element 42 to rest on the sleeve.

The operation of the mechanism briefly is as follows: With the stop 32 adjusted to the bottom of the slot 33, as in Figs. 1 and 2, the shutter is ready for an instantaneous exposure, and upon depressing the finger piece 11 and lever 8, the shutter guard is moved clockwise on its axis 6 from the position shown in Fig. 1 to the position shown in Fig. 2, carrying with it the shutter blade by reason of the lug 17 on the shutter guard engaging the spring finger 27 of the shutter blade, the finger 27 moving radially relatively to the lug 17 due to their eccentric motions. This movement continues until the parts reach the Fig. 2 position when the finger 27, moving in a circular path which intersects the path of movement of the lug 17, slips off the lug 17 and is released, to permit return of the shutter blade under the action of its spring 28 until the tail-piece 31 re-engages the stop 32. During such return movement of the shutter blade, the exposure aperture 4 is uncovered by the central opening 25 in the shutter blade and subsequently covered by the body portion of the shutter blade, as shown in Fig. 1, and during the outward movement of the shutter blade, opening 25 moves over the exposure aperture 4 without uncovering the latter because the shutter guard is then in position over the exposure aperture and continues to cover the latter until the shutter blade has moved far enough to again cover the exposure aperture during its outward travel. During the return movement of the shutter blade, the pinion 38 and weighted element 42 are rotated in a clockwise direction by the gear segment 37 until the shutter blade tail-piece 31 again strikes the stop 32, holding the shutter blade and pinion 38 against further movement, while the weighted element 42 is permitted to travel a slight distance additionally due to the momentum it has gained and by reason of the yielding action of the spring 43.

When it is desired to operate the shutter for a time exposure, the finger piece 36 is pushed downwardly from the position shown in Figs. 1 and 2 to the position shown in Figs. 3 and 4, moving the stop 32 to the upper end of the slot 33 and carrying with it the shutter blade until the tail-piece 31 of the latter rests against one side of the stop 32. In this position of the parts, the central opening 25 of the shutter blade is over the exposure aperture 4, which latter is covered by the body portion 5 of the shutter guard. When the shutter is operated to move the parts from the position shown in Fig. 3 to that shown in Fig. 4, the shutter guard continues to cover the exposure aperture 4 until the shutter blade reaches the slip-off position, that is, until the lug 17 of the shutter guard has moved far enough to release the finger 27, whereupon the shutter blade is released and returns to initial position to open the aperture 4, which remains open for exposure until the finger piece 11 is released by the operator, whereupon the shutter guard returns to initial position and closes the exposure aperture 4.

During the return travel of the shutter guard, either when the parts are adjusted for instantaneous or time exposures, lug 17 rides under the inclined spring finger 27, which lifts slightly under the movement of the lug 17, until the latter passes beyond the finger 27 which drops down in front of lug 17, and the parts are then in position for another operation.

While the structure has been described with reference to a particular embodiment, the invention is not confined to the detailed construction herein disclosed, and this application is intended to cover such modifications or departures as may come within the purposes of the improvements or the scope of the following claims.

I claim:

1. In a photographic shutter, the combination with a supporting plate having an exposure aperture, of a shutter guard pivotally mounted on the supporting plate and having a radial extension with an actuating lug at its outer end, a shutter blade pivotally mounted on the supporting plate above the shutter guard and movable about a center spaced from the center of movement of the shutter guard, the shutter blade having a cut-away portion movable over the exposure aperture, and a spring arm extending peripherally of said cut-away portion and terminating in a radially projecting finger engaged by the aforesaid lug during their forward movements and movable radially relatively to the latter to release the shutter blade before the shutter guard reaches the limit of its movement, the lug moving under said finger for reengagement therewith during the return movement of the shutter guard.

2. In a photographic shutter, the combination with a supporting plate having an exposure aperture, of a shutter guard pivotally mounted on the supporting plate and having a recessed portion which uncovers said aperture at the limit of movement of the shutter guard, a radial extension on the shutter guard having an upstanding actuating lug at its outer end, a shutter blade pivotally mounted on the supporting plate above the shutter guard and movable about a center spaced from the center of movement of the shutter guard, the shutter blade having a cut-away portion movable over the exposure aperture, an outwardly inclined spring arm extending peripherally of said cut-away portion and terminating in a radially projecting bevelled finger engaged by the actuating lug during their forward movements and movable radially relatively to said lug to release the shutter blade before the shutter guard reaches the limit of its forward movement, the lug moving under said finger for reengagement therewith during the return movement of the shutter guard, a stop lug on the shutter guard engageable with the adjacent edge of the shutter blade, and a lug on the supporting plate limiting forward movement of the shutter blade and shutter guard.

3. In a photographic shutter, the combination with a supporting plate having an exposure aperture, of a shutter guard pivotally mounted on the supporting plate and having a radial extension with an actuating lug at its outer end, a shutter blade pivotally mounted on the supporting plate and movable about a center in vertical alinement with said aperture and spaced slightly above and to one side of the center of movement of the shutter guard, the shutter blade having a cut-away portion movable over the exposure aperture, and an outwardly inclined spring arm extending peripherally of said cut-away portion, said spring arm terminating in a radially extending bevelled finger arranged for engagement by the aforesaid lug and movable radially relatively thereto for release before the shutter guard reaches the limit of its forward movement, said lug being movable under the bevelled finger and the spring arm being movable slightly away from the plane of the shutter blade to permit reengagement of the lug with the finger during the return movement of the shutter guard.

JULIUS A. HENNE.

REFERENCES CITED

The following references are of record in the file of this patent:

UNITED STATES PATENTS

| Number | Name | Date |
|---|---|---|
| 2,119,712 | Koszalka | June 7, 1938 |
| 2,172,238 | Burkhardt | Sept. 5, 1939 |
| 2,206,811 | Drotning et al. | July 2, 1940 |
| 2,252,688 | Blank | Aug. 19, 1941 |